United States Patent [19]

Bolger

[11] 3,886,228

[45] May 27, 1975

[54] POLYURETHANE COMPOSITION CURABLE WITH POLYAMINE/ACID ANHYDRIDE ADDUCT

[75] Inventor: Justin C. Bolger, Dover, Mass.

[73] Assignee: Amicon Corporation, Lexington, Mass.

[22] Filed: June 3, 1974

[21] Appl. No.: 475,763

[52] U.S. Cl..... 260/858; 260/77.5 CH; 260/77.5 R; 260/77.5 TB; 260/78 TF; 260/830 P; 260/859
[51] Int. Cl... C08g 22/04; C08g 30/10; C08g 41/04
[58] Field of Search.... 260/77.5 R, 77.5 TB, 78 TF, 260/77.5 AM, 77.5 CH, 830 P, 858

[56] References Cited
UNITED STATES PATENTS

| | | | |
|---|---|---|---|
| 3,321,548 | 5/1967 | Sattler | 260/829 |
| 3,523,925 | 8/1970 | Kamal et al. | 260/77.5 CH |
| 3,565,972 | 2/1971 | Harris | 260/830 P |
| 3,636,133 | 1/1972 | Hawkins | 260/824 EP |
| 3,639,338 | 1/1972 | Kuder | 260/47 EN |
| 3,654,191 | 4/1972 | Habermeier et al. | 260/2 N |
| 3,671,486 | 6/1972 | Dixon et al. | 260/37 N |
| 3,699,075 | 10/1972 | Lubowitz | 260/49 |
| 3,716,519 | 2/1973 | Yoda et al. | 260/47 CB |
| 3,817,918 | 6/1974 | Aufderwarsh | 260/47 EP |
| 3,817,926 | 6/1974 | Pauze et al. | 260/65 |

*Primary Examiner*—H. S. Cockeram

[57] ABSTRACT

A single-package curable polyurethane resin composition containing a polyisocyanate which may or may not be blocked and as a curing agent a condensation product obtained by reacting, with removal of an equimolecular proportion of water, approximately equimolecular proportions of diethylenetriamine or triethylenetetramine with phthalic or hexahydrophthalic anhydride, maleic anhydride or succinic anhydride. Epoxy resin may also be present in the composition.

17 Claims, No Drawings

POLYURETHANE COMPOSITION CURABLE WITH POLYAMINE/ACID ANHYDRIDE ADDUCT

This invention relates to novel storable and curable polyurethane resin compositions, to the method of making and curing such compositions, and to articles made therefrom.

Amines in general and aliphatic amines in particular are well known to react rapidly with polyisocyanates including isocyanate-terminated prepolymers to bring about curing by cross-linking even at room temperature. Because of the rapidity of reaction, it has generally been necessary to mix the amine with the polyisocyanate shortly before use in order to avoid premature curing; this necessitates shipping and storing such materials as two components in two separate packages or containers.

It has also been proposed to provide single component curable compositions by employing the moisture of the atmosphere as the cross-linking agent for the polyisocyanate, which is practicable only for making polyurethane articles in the form of thin films, or by blocking the isocyanate groups to prevent premature reaction at room temperature, as in the case of the ketamine- or phenol-blocked polyisocyanates. In the latter case, the blocking agent is released as a by-product during cure at elevated temperature, a result which limits the utility of such polyisocyanates, depending upon the nature of the by-product.

It has now been found that a special class of amine condensation products is effective as a curing agent for polyisocyanates at elevated temperature, particularly when used in conjunction with epoxy resins, but is virtually inactive at temperatuares as high as 40°C., making practicable single component compositions which can be shipped and stored in a single container for extended periods of time before use. Such unitary compositions are sensitive to water, alcohols, and other compounds containing active hydrogen atoms, so that in order to achieve maximum stability and shelf-life, it is necessary that they be made and stored under anhydrous conditions and that they not contain or be mixed with fillers which have adsorbed water or with other ingredients, such as various resins, containing active hydrogen atoms. It has further been found that partial blocking of the isocyanate groups of aromatic polyisocyanates (including isocyanate terminated prepolymers) with phenols, alkyl phenols, polyphenols or phenolic novolacs, eliminates sensitivity of the compositions of the present invention to compounds containing active hydrogen atoms without significantly decreasing the shelf-life or the curing rate at elevated temperature and without deterioration of the physical properties of the products after cure.

The amine condensation products which can be used in the present invention are those obtained by condensing, with removal of water, approximately equimolecular proportions of an amine selected from the group consisting of diethylenetriamine and triethylenetetramine with a carboxylic anhydride selected from the group consisting of phthalic anhydride, hexahydrophthalic anhydride, maleic anhydride and succinic anhydride, said condensation product having a melting point from 75° to 130°C. Phthalic anhydride and maleic anhydride are preferred. The amine condensation products can be prepared as described in U.S. Pat. Nos. 3,488,742 and 3,639,657 by heating equimolecular proportions of the amines and the anhydrides at a temperature from 50° to 160°C. while permitting the water by-product to evaporate, or by using an excess of the amine and evaporating the excess along with by-product water after an initial reaction period. If desired, a solvent inert to the reactants, such as benzene, may be used and removed along with the excess amine and water.

The polyisocyanates which can be used in the curable polyurethane resin composition of the present invention include any of those commonly employed in making polyurethane plastics or resins such as toluene diisocyanate, 4,4-diphenylmethane diisocyanate, polyaryl polyisocyanates, and hexamethylene diisocyanate. As is well known, resins made from such polyisocyanates are brittle so that for most purposes it is preferred to use the conventional polyisocyanate prepolymers having an average of more than a single isocyanate group per molecule, made by pre-reacting a molecular excess of a diisocyanate such as one of the foregoing with an organic material containing at least two hydroxyl groups per molecule and having a molecular weight of at least 300, such as castor oil, a hydroxy-terminated polyether, e.g., a polyalkylene glycol in which each alkylene group contains from 2 to 6 carbon atoms, a hydroxy-terminated polyester, particularly an aliphatic polyester of an alkylene glycol in which each alkylene contains 2 to 6 carbon atoms with an aliphatic polycarboxylic acid which contains in addition to the carboxyl groups only hydrocarbon groups, the total number of carbon atoms in the acid being preferably from 3 to 10, or a hydroxy-terminated polybutadiene or butadiene-acrylonitrile copolymer. Polyethers such as polyethylene glycol, polypropylene glycol and polytetramethylene glycol having molecular weights from 300 to 2,000 and polyesters such as the hydroxy-containing polyesters of any of the polyalkylene glycols, preferably those having 2 to 6 carbon atoms, with polycarboxylic acids containing from 3 to 10 carbon atoms and containing only hydrocarbon groups in addition to carboxyl groups are also preferred. Such polyesters have an average equivalent weight (based on hydroxyl groups) of 150–1,000 and have 2 to 4 hydroxyl groups per molecule. Prepolymers are preferred which are made by reacting at least two molecular proportions of a diisocyanate as described above with a polyalkylene glycol as described above to form a prepolymer having an equivalent weight (based upon isocyanate groups) of 400–1,500, but other prepolymers having an equivalent weight (isocyanate) within the same range are also desirable.

In general, partial blocking of the polyisocyanate in those cases where blocking is desired, whether it be a simple diisocyanate or a polyisocyanate prepolymer, can be achieved by heating it with a phenolic material at 80°–120°C. Preferably, the polyisocyanate used for blocking is an aromatic polyisocyanate, since the product produces a faster cure rate. Simple alkyl phenols in which the alkyl groups contain 2–12 carbon atoms, such as nonyl phenol and dinonyl phenol, are effective and indeed are preferred for blocking purposes because no objectionable volatile by-products are liberated during the blocking reaction and because such blocked polyisocyanates are liquids. Polyphenols such as 4,4'-dihydroxydiphenyl methane, bisphenol A, and phenolic novolacs can also be used for blocking but the blocked products are of very high viscosity. The amount of blocking agent employed need not be sufficient to react with all of the isocyanate groups in the polyisocyanate; in general, from 0.4 to 1.0 equivalent weight of phenolic material for each isocyanate equivalent weight provides sufficient resistance to moisture, that is, at least 40% of the isocyanate groups are reacted with the blocking agent. It is not necessary to employ a solvent such as benzene for carrying out the blocking reaction, although such a solvent can be used; generally, it is preferred to omit any solvent. It is also preferred to avoid heating the polyisocyanate and phenolic material for excessively long times because this tends to reduce the rate of cure of the mixtures made with such products. As little as two hours heating at 100°C. is effective to produce substantial blocking and protection against moisture, while more than 18 hours tends to slow the cure time undesirably.

While the amine condensation products of the present invention by themselves cause rapid gelation when mixed with polyisocyanates (including polyisocyanate prepolymers), they product a final cure only over an extended period of time even at elevated temperature. In addition, the products are flexible and soft, usually having a hardness less than about 50 on the Durometer D scale and display good adhesion to most other synthetic plastic surfaces when cured in contact therewith. In order to obtain cured products of increased hardness as well as to accelerate the rate of cure, it may be preferred to employ, along with the polyisocyanate, an epoxy resin containing an average of more than a single oxirane group per molecule. As little as 5% by weight of epoxy resin, based on the weight of the polyisocyanate, produces a substantial increase in hardness of the finished product. Mixtures containing as much as 95% by weight of epoxy resin with 5% by weight of the polyisocyanate, i.e., mixtures in which the epoxy resin is 1900% by weight of the polyisocyanate, can be used without destroying the good adhesive properties of the finished product.

A variety of epoxy resins can be used to provide these effects without detracting appreciably from the stability of the mixture at temperatures up to 40°C. Among the epoxy resins which can be thus used are polyepoxides having an average of more than a single oxirane (1,2-epoxy) group per average molecule, including such polyepoxides as polyglycidyl ethers of polyhydric alcohols such as ethylene glycol, diethylene glycol, triethylene glycol, 1,2-propylene glycol, 1,4-butylene glycol, 1,5-pentanediol, di-, tri-, and higher polyalkylene glycols, 2,4,6-hexanetriol, glycerol, trimethylolpropane and the like as well as the polyglycidyl ethers of polyphenols such as 2,2-bis(4-hydroxyphenyl) propane (also called bisphenol A), 4,4'-dihydroxydiphenylmethane, 4,4'-dihydroxybenzophenone, 1,1-bis(4-hydroxyphenyl) ethane, 2,2-bis(4-hydroxytertiarybutylphenyl) propane, bis(2-hydroxynaphthyl) methane, 1,5-dihydroxynaphthalene or a phenolic novalac resin. Such polyepoxides can be made by reacting epichlorohydrin or the like with the appropriate polyhydric alcohol or phenolic compound in the presence of an alkali. Other polyepoxides which can be used are the partial fatty acid esters of any of the foregoing polyglycidyl ethers, or epoxidized oils such as epoxidized soybean oil, or the glycidyl ether-glycidyl amines of aminophenol.

Other epoxy resins containing more than a single oxirane group per molecule which may be employed in the present invention are the polyglycidyl esters of polycarboxylic acids which are produced by the reaction of epichlorohydrin or a similar epoxy compound with an aliphatic or aromatic polycarboxylic acid such as oxalic acid, succinic acid, glutaric acid, adipic acid, azelaic acid, phthalic acid, isophthalic acid, terephthalic acid, 2,5-naphthalene dicarboxylic acid, dimerized linoleic acid, and the like; and polyglycidyl esters made by reacting polyglycidyl ethers such as those of the preceding paragraph with polycarboxylic acids such as the foregoing.

The amount of amine condensation product present in the composition must be enough to provide amino hydrogen atoms (both primary and secondary) in an amount equal to at least 0.5 of the amount stoichiometrically equivalent to the total isocyanate groups (including blocked isocyanate groups) present in the composition. When no epoxy resin is present in the composition, the product after curing is cross-linked and thermoset if the amount of primary amino hydrogen atoms present is less than that approximately stoichiometrically equivalent to the total isocyanate groups (including blocked isocyanate groups); if the amount of primary amino hydrogen atoms is from about 1 to 1.4 times the amount stoichiometrically equivalent, the product after curing is thermoplastic; it is preferred that the total amount of primary amino hydrogen atoms present not exceed 1.4 times the stoichiometrically equivalent amount.

When epoxy resin is present in the composition, there should be present an additional amount of amine condensation product in addition to the amounts set forth in the preceding paragraph. The additional amount must be enough to provide amino hydrogen atoms (both primary and secondary) in an amount from 0.7 to 1.5 times that equivalent to the oxirane groups present in the composition.

The following examples are intended to illustrate the invention without serving as a limitation upon its scope.

EXAMPLE I

There are provided a polyisocyanate prepolymer, hereinafter identified as "urethane A," commercially available under the trade name Adiprene L-167, made by reacting one mol of polytetramethylene glycol (mol. wt. 1000) with at least two mols of toluene diisocyanate. The prepolymer, which has a viscosity of 12,000 cps. at 25°C. contains 6.7% by weight of isocyanate groups and has an isocyanate equivalent weight of approximately 670.

There was also provided an amine condensation product, hereinafter identified as "amine A," made by heating 9064 g. diethylene triamine with 3256 g. phthalic anhydride (in a molar ratio of 4:1) at about 100°C. for 2 hours, after which the unreacted diethylene triamine (6456 g.) together with about 1 mole of water (394 g.) per mole of phthalic anhydride were removed by vacuum distillation at a pressure of 20 mm. mercury, as described in Example 1 of U.S. Pat. No. 3,488,742. The condensation product, which has a softening point of about 104°C. and contains nitrogen in the form of imide as well as amide and primary and secondary amine groups. It has an equivalent weight (based on total amino groups) of 100, an equivalent weight (based on primary amino groups) of 187, and an equivalent weight (based on total amino hydrogen atoms) of 66.

One hundred grams of urethane A were mixed with 18 grams of amine A, which had been pulverized to pass through a 325 mesh screen. A portion of this paste was tested for cure rate by stroking several grams on the surface of a 320°F. hot plate. The "stroke cure" time so measured was approximately 20 minutes, although a sharp end point was hard to measure due to volatilization of amine A during the test and also because a rapid thickening, or "false gel" occurs within the first 10 to 15 seconds of the test. A 10 gram mass of the mixture was placed in an aluminum dish in a 250°F. oven. The mixture was not hard after 3 hours but after 6 hours had cured to a very soft urethane elastomer, Shore A hardness approximately 40, which exhibited excellent adhesion to the aluminum dish. The remainder of the paste was divided into two sealed jars; one stored at 40°C. (104°F.) and the other at room temperature. At the end of 28 days the stored mixtures were inspected and found to be still liquid, curable and usable, indicating their long shelf life.

EXAMPLE II

There was provided as an epoxy resin component, hereinafter identified as "epoxy A," a material sold under the trade name Epon 828 which was a diglycidyl ether of 2,2-bis(4-hydroxyphenyl) propane having a viscosity of 14,000 cps. at 25°C. and an epoxy equivalent weight of 190.

Fifty grams of epoxy A were mixed with 100 grams of urethane A and 35 grams of powdered amine A. Separately, 17 grams of amine A were mixed with 50 grams of epoxy A. Stroke cures and shelf lives of the two mixtures, determined as in Example I, were as follows:

| | Stroke Cure 320°F. | Shelf Life 40°C. | Hardness, Shore D |
|---|---|---|---|
| Amine A + urethane A + epoxy A | 15 sec. | >14 days | 60 |
| Amine A + epoxy A | 35 sec. | >14 days | 84 |

The results clearly show not only that the addition of the epoxy dramatically accelerates the cure rate without loss of shelf life, but also that the three component mixture is faster than the epoxy-amine mixture alone, indicating some synergistic coreaction is taking place.

EXAMPLE III

There was prepared a partially blocked polyisocyanate prepolymer, hereinafter identified as "urethane B-1" by mixing one isocyanate equivalent weight of urethane A (670 g.) with one equivalent weight of a nonyl phenol (220 g.) and heating the mixture in a closed container for two hours at 100°C. to cause the blocking reaction to occur, then allowing it to cool to room temperature.

A mixture was prepared of 130 g. of urethane B-1, 50 g. of epoxy A, and 35 g. of amine A. Cure rate, shelf life, and hardness, determined as in the preceding examples, were 27 sec., > 14 days, and 55 (Shore D) respectively.

Sensitivity to atmospheric moisture was determined by spreading side by side on a metal panel films of each of the mixtures of Examples I–III and also of urethane A alone and allowing the panel to stand in the atmosphere at room temperature. After three days the film of urethane A alone and of the mixtures of Examples I and II had all hardened or cured, while the mixture of Example III was still liquid and could still be cured to a hard solid by heating.

EXAMPLE IV

There was provided an epoxy resin containing residual free hydroxyl groups, hereinafter identified as "epoxy B," in the form of a mixture of mono-, di-, and tri-glycidyl ethers of glycerine, commercially available under the trade name DER XD-7160.

A first mixture was made consisting of 50 g. amine A, 100 g. epoxy A, 20 g. epoxy B, and 50 g. urethane A.

A second mixture was made in which the 50 g. of urethane A was replaced with 60 g. of the partially blocked urethane B-1.

The two mixtures were then stored in closed containers under identical conditions for 16 hours at 40°C. after which the first mixture was found to have gelled. The second mixture, containing the partially blocked polyisocyanate prepolymer, remained liquid and usable for heatcuring, even after storage at 40°C. had continued for 14 days. The first mixture displayed a stroke cure (320°F.) of 10 sec., while that of the second mixture was 16 sec., showing that the partially blocked polyisocyanate prepolymer can be substituted for the unblocked polyisocyanate prepolymer with no significant loss in shelf life in closed containers and with only a moderate reduction in cure rate. The hardness of the cured product (urethane B-1) was 70 (Shore D).

EXAMPLE V

An epoxy ester resin, hereinafter called "epoxy C," was prepared by reacting dimerized linoleic acid with a molar excess of epoxy A, then diluting with butyl glycidyl ether to provide a liquid mixture having a viscosity of 50,000 cps. at 25°C. and an epoxide equivalent weight of 450.

A partially blocked polyisocyanate prepolymer, hereinafter called "urethane B-2," was prepared by mixing one isocyanate equivalent weight of urethane A (670 g.) with 0.8 equivalent weight of nonyl phenol (176 g.), heating the mixture for 2 hours at 100°C. in a closed container to cause the blocking reaction to take place, and then allowing the mixture to cool to room temperature.

A liquid mixture was made of 40 parts by weight epoxy A, 15 parts epoxy B, 75 parts polyester epoxy C and 20 parts blocked isocyanate B-2. Into this was dispersed, at high shear, 8 parts pyrogenic silica (Cab-O-Sil EH-5). This mixture was placed in a vacuum-Ross mixer and blended with 10 parts molecular sieves, 40 parts powdered amine A, 0.2 part glycerine, 40 parts 325 mesh pyrophyllite, 40 parts powdered calcium carbonate, 30 parts milled glass fibers (Vitrostrand G), 0.4 part carbon black pigment and 0.1 part silane (A-187). After mixing for 40 minutes under vacuum, this blend gave a thixotropic, nonsagging paste which could be used to replace lead in filling joints and seams on automobile assembly lines. The mixture adhered well to oily steel when cured above 300°F., could be cured with a hot (600°F. air temp.) air gun in 2 minutes in thick sections on curved "C" pillar joints of passenger cars, and provided excellent shock resistance and corrosion-resistance after cure, sanding and painting. The presence of the blocked urethane resin serves to improve adhesion and shock resistance of the cured product and also to increase cure speed. Similar results are obtained using 10 parts of blocked isocyanate B-2 instead of 20 parts.

EXAMPLE VI

There was prepared a polyisocyanate prepolymer, hereinafter called "urethane B" by reacting polytetramethylene glycol (mol. wt. 1000) with 4,4'-diphenylmethanediisocyanate at a ratio sufficient to produce a product containing 9.4% by weight of NCO.

A partially blocked polyisocyanate prepolymer, hereinafter called "urethane B-3," was made by heating one isocyanate equivalent weight of urethane B with one equivalent weight of nonyl phenol at 100°C. for 2 hours, then cooling to room temperature.

Six different liquid mixtures were then prepared containing various proportions by weight of several components, each including a small amount of molecular sieve as a moisture scavenger, as set forth in the following table, and tested for shelf life and for stroke cure as in Example I:

| Mixture | 1 | 2 | 3 | 4 | 5 | 6 |
|---|---|---|---|---|---|---|
| Epoxy A | 100 | 100 | 100 | 100 | 100 | 100 |
| Amine A | 50 | 50 | 50 | 50 | 50 | 50 |
| Molecular Sieves | 5 | 5 | 5 | 5 | 5 | 5 |
| Urethane B-1 | 100 | 150 | 50 | | | 100 |
| Urethane B | | | | 100 | | |
| Urethane B-3 | | | | | 100 | 50 |

Shelf Life: After 7 days storage at 40°C., all mixtures still liquid. After 4 months at 40°C., composition No. 4 had gelled, but all others still liquid.

Stroke Cure (seconds), measured after storage for:

| | 1 | 2 | 3 | 4 | 5 | 6 |
|---|---|---|---|---|---|---|
| 4 days/40°C. | 8 | 8 | 4 | 8 | 6 | 6 |
| 4 mos/40°C. | 26 | 27 | 26 | (gelled after 40 days) | 20 | 28 |

Samples of each mixture were cured for three different time periods in a hot air oven at 250°F. and the hardness (Shore D) of the cured products was measured, as follows:

| Cure time at 250°F. | 1 | 2 | 3 | 4 | 5 | 6 |
|---|---|---|---|---|---|---|
| 5 min. | 68D | 37D | 78D | 66D | 69D | 63D |

| Cure time at 250°F. | 1 | 2 | 3 | 4 | 5 | 6 |
|---|---|---|---|---|---|---|
| 10 min. | 69D | 40D | 80D | 68D | 69D | 64D |
| 72 hrs. | 69D | 60D | 79D | 68D | 69D | 64D |

All of the cured products displayed useful properties, the modulus varying depending upon urethane content.

EXAMPLE VII

Seven different liquid mixtures were prepared containing amine condensation products and polyisocyanates, five of which also contained epoxy resin, and, for contrast, an eighth mixture containing only amine condensation product and epoxy resin was also prepared as set forth in the following table in which the parts are by weight:

| Component | 1 | 2 | 3 | 4 | 5 | 6 | 7 | 8 |
|---|---|---|---|---|---|---|---|---|
| Epoxy A | — | — | 10 | 50 | 50 | 50 | 100 | 100 |
| Amine A | 30 | 15 | 18.5 | 47.5 | 32.5 | 22 | 38 | 35 |
| Urethane A | 100 | 100 | 100 | 100 | 100 | 95 | 10 | — |
| Molecular sieves | 3 | 3 | 3 | 3 | 3 | 3 | 3 | 3 |

The stroke cure of each mixture was measured as in Example I with the following results:

| Stroke Cure (seconds), at 320°F. | 1 | 2 | 3 | 4 | 5 | 6 | 7 | 8 |
|---|---|---|---|---|---|---|---|---|
| Initial | 7 | 14 | 15 | 6 | 8 | 8 | 25 | 32 |
| After 4 weeks storage at 40°C. | 5 | 8 | 7 | 4 | 6 | 6 | 28 | 31 |

All mixtures were still liquid and useful after storage in closed containers for 4 weeks at 40°C. Mixtures Nos. 1 and 2 both formed soft rubbery products when cured at 250°F., but No. 1 was thermoplastic, forming a viscous liquid at 320°F., whereas No. 2 softened but remained a thermoset solid at that temperature.

EXAMPLE VIII

A liquid composition was prepared containing the following ingredients, in which the parts are by weight. The titanium dioxide pigment was pre-dried by heating at 110°C. and the mixing was carried out under vacuum in a vacuum jacketed double planetary mixer.

| Parts | Component |
|---|---|
| 100 | Liquid diglycidyl ether of dihydroxydiphenylmethane |
| 60 | Urethane B-2 |
| 40 | Amine A |
| 10 | Molecular sieves |
| 30 | Titanium dioxide |

The viscosity of the mixture immediately after preparation was 50,000 cps. at 23°C. The viscosity of the mixture increased slowly during storage in closed containers, both at 23°C. and at 40°C., reaching a maximum of 280,000 cps. (at 23°C.) after 20 days and 7 days respectively; the thickened material could be used at room temperature or could be warmed to lower its viscosity, which decreased to 50,000 cps. at 30°C. and to 12,000 cps. at 50°C. The thickened material cured rapidly; after curing 30 min. at 200°F., the product displayed a hardness (Shore D) of 30; when cooled to room temperature, the hardness increased to 62. When a film of the thickened mixture was cured to bond two sheets of aluminum together in accordance with ASTM Procedure No. D 1002, the tensile shear strength was 700 p.s.i.

When an unsaturated anhydride such as maleic anhydride is used in making the amine condensation product, cross-linking of the mixture with polyisocyanate can also be achieved by including a small amount of a peroxide catalyst in the mixture to cause polymerization of the double bonds. If desired, vinyl monomers such as styrene, methyl methacrylate etc. can be included together with the peroxide to produce additional cross-linking during cure.

What is claimed is:

1. A curable polyurethane resin composition comprising a polyisocyanate and as a curing agent therefor a condensation product obtained by reacting, with removal of an equimolecular proportion of water, approximately equimolecular proportions of an amine selected from the group consisting of diethylenetriamine and triethylenetetramine with an anhydride selected from the group consisting of phthalic anhydride, hexahydrophthalic anhydride, maleic anhydride and succinic anhydride, said condensation product having a melting point from 75° to 130°C., the amount of said condensation product being at least enough to provide primary and secondary amino hydrogen atoms equivalent to the total number of isocyanate groups present.

2. A curable polyurethane resin composition as claimed in claim 1 comprising in addition from 5% to 1900% by weight, based on the weight of polyisocyanate, of an epoxy resin containing an average of more than a single oxirane group per molecule together with an amount of said condensation product containing primary and secondary amino hydrogen atoms equivalent to 0.7 to 1.5 times the total number of oxirane groups.

3. A curable polyurethane resin composition as claimed in claim 1 in which said polyisocyanate is a prepolymer of a hydroxyl-containing organic compound having a molecular weight of at least 300 with an excess of a diisocyanate, said prepolymer having an average of more than a single isocyanate group per molecule.

4. A curable polyurethane resin composition as claimed in claim 2 in which said polyisocyanate is a prepolymer of a hydroxyl-containing organic compound having a molecular weight of at least 300 with an excess of a diisocyanate, said prepolymer having an average of more than a single isocyanate group per molecule.

5. A curable polyurethane resin composition as claimed in claim 1 in which said polyisocyanate is a blocked aromatic polyisocyanate in which at least 40% of the isocyanate groups are reacted with a blocking agent selected from the group consisting of phenols, polyphenols, and phenolic novolacs.

6. A curable polyurethane resin composition as claimed in claim 5 comprising in addition from 5% to 1900% by weight, based on the weight of polyisocyanate, of an epoxy resin containing an average of more than a single oxirane group per molecule together with an amount of said condensation product containing primary and secondary amino hydrogen atoms equivalent to 0.7 to 1.5 times the total number of oxirane groups.

7. A curable polyurethane resin composition as claimed in claim 6 in which said aromatic polyisocyanate is a prepolymer of a hydroxyl-containing organic compound having a molecular weight of at least 300 with an excess of an aromatic diisocyanate, said prepolymer having an average of more than a single isocyanate group per molecule.

8. A curable polyurethane resin composition as claimed in claim 7 in which said blocking agent is nonyl phenol.

9. A curable polyurethane resin composition as claimed in claim 7 in which said blocking agent is 2,4-dinonyl phenol.

10. A curable polyurethane resin composition as claimed in claim 1 in which said amine is diethylenetriamine.

11. A curable polyurethane resin composition as claimed in claim 1 in which said amine is diethylenetriamine and said anhydride is selected from the group consisting of phthalic anhydride and maleic anhydride.

12. A curable polyurethane resin composition as claimed in claim 2 in which said amine is diethylenetriamine and said anhydride is selected from the group consisting of phthalic anhydride and maleic anhydride.

13. A curable polyurethane resin composition as claimed in claim 3 in which said amine is diethylenetriamine and said anhydride is selected from the group consisting of phthalic anhydride and maleic anhydride.

14. A curable polyurethane resin composition as claimed in claim 2 in which said amine is diethylenetriamine and said anhydride is selected from the group consisting of phthalic anhydride and maleic anhydride and in which said polyisocyanate is a prepolymer of a hydroxyl-containing organic compound having a molecular weight of at least 300 with an excess of a diisocyanate, said prepolymer having an average of more than a single isocyanate group per molecule.

15. A curable polyurethane composition as claimed in claim 5 in which said amine is diethylenetriamine and said anhydride is selected from the group consisting of phthalic anhydride and maleic anhydride.

16. A curable polyurethane resin composition as claimed in claim 6 in which said amine is diethylenetriamine and said anhydride is selected from the group consisting of phthalic anhydride and maleic anhydride.

17. A curable polyurethane resin composition as claimed in claim 7 in which said amine is diethylenetriamine and said anhydride is selected from the group consisting of phthalic anhydride and maleic anhydride.

* * * * *